United States Patent
Martinez et al.

(10) Patent No.: US 7,373,494 B2
(45) Date of Patent: ***May 13, 2008

(54) METHOD FOR USING A TIMER BASED SMI FOR SYSTEM CONFIGURATION AFTER A RESUME EVENT

(75) Inventors: Ricardo L. Martinez, Austin, TX (US); Todd Martin, Austin, TX (US); Jim Walker, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/670,834

(22) Filed: Feb. 2, 2007

(65) Prior Publication Data

US 2007/0130484 A1    Jun. 7, 2007

Related U.S. Application Data

(62) Division of application No. 10/755,132, filed on Jan. 9, 2004, now Pat. No. 7,188,236.

(51) Int. Cl.
*G06F 15/177* (2006.01)
(52) U.S. Cl. .......................................... 713/1; 713/323
(58) Field of Classification Search ..................... None
See application file for complete search history.

(56) References Cited

U.S. PATENT DOCUMENTS

| | | | |
|---|---|---|---|
| 6,052,793 A | 4/2000 | Mermelstein | |
| 6,122,748 A | 9/2000 | Hobson | |
| 6,219,742 B1 | 4/2001 | Stantley | |
| 6,567,931 B1 | 5/2003 | Jue | |
| 6,640,316 B1 | 10/2003 | Martin et al. | |
| 6,691,234 B1 | 2/2004 | Huff | |
| 2003/0145240 A1 | 7/2003 | Chen et al. | |
| 2003/0154339 A1 | 8/2003 | Wu et al. | |
| 2004/0073818 A1 | 4/2004 | Cheok et al. | |
| 2004/0210728 A1* | 10/2004 | Flautner et al. ............. 711/156 |
| 2005/0154870 A1 | 7/2005 | Martinez et al. | |

* cited by examiner

*Primary Examiner*—Dennis M. Butler
(74) *Attorney, Agent, or Firm*—Haynes and Boone, LLP

(57) ABSTRACT

An information handling system (IHS) includes a processor, a memory coupled to the processor, a basic input/output system (BIOS) stored as instructions on a portion of the memory, an event handler component operable to receive notification of an occurrence of at least one event in the IHS, a first device configuration component operable to configure at least one device from a first group of devices of the IHS, a second device configuration component operable to configure at least one device from a second group of devices of the IHS, a time delay component operable to introduce a predefined time delay and a control transfer component operable to transfer control between the BIOS and an operating system of the IHS responsive to the at least one event.

11 Claims, 4 Drawing Sheets

METHOD FOR USING A TIMER BASED SMI FOR SYSTEM CONFIGURATION AFTER A RESUME EVENT

The present application is a Divisional of U.S. application Ser. No. 10/755,132 filed Jan. 9, 2004, now U.S. Pat. No. 7,188,236, issued on Mar. 6, 2007, the disclosure of which is incorporated herein by reference.

BACKGROUND

The present disclosure relates generally to information handling systems, and more particularly to techniques for an improved wake mechanism of an information handling system following a resume event.

As the value and use of information continues to increase, individuals and businesses seek additional ways to acquire, process and store information. One option available to users is information handling systems. An information handling system ('IHS') generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

To reduce power consumption, various components of an IHS may be placed into a variety of different power states with differing levels of power consumption. For example, video output from a computer system, processor operation, and hard disk drive rotation may be deactivated during periods of system inactivity. More sophisticated power management schemes have been developed and implemented as industry standards including the Advanced Power Management APM) Specification described in the Advanced Power Management (APM) BIOS interface Specification, Revision 1.2, dated February 1996, and the Advanced configuration and Power Interface (ACPI) standard described in the Advanced configuration and Power Interface Specification, Revision 2.0c, dated Aug. 25, 2003, both of which are hereby incorporated herein, in their entirety, by reference.

Such standards define a variety of operational states depending upon system activity and the amount of power being consumed. For example, the ACPI specification defines various "sleeping" states such as S0-S5. In the S0 state (also known as the G0 state) the IHS is fully on and operational, consuming maximum power. In the S5 state (also known as the soft-off state) the computer system consumes a minimal amount of power. In this state, typically no instructions are executed by a processor included in the computer system, almost all devices included in the computer system are inactive, and the computer system generally awaits occurrence of a wakeup or resume event to transition it to a higher activity state. Awakening from the S5 soft-off state typically requires a complete boot of the computer system because no system context is saved prior to entering S5. As is well known, a basic input/output system ('BIOS') of the computer system typically includes instructions configured to cause the computer system to be initialized and the operating system to be booted. The sleep states between S0 and S5 each specify varying amounts of component activity and therefore power consumption. States S1-S5 may have differing wakeup latency times depending upon which devices are inactive, how much computer system context was saved prior to entering the sleep state, and other factors. Power management schemes like APM and ACPI need not have multiple sleep states, but may simply have a fully on state and a state of lower power consumption, such as a soft-off power state.

An Instantly Available PC ('IAPC') is a well-known power management technology, which is described in 'The Instantly Available Power Managed Desktop PC Design Guide', Revision 1.2, Sep. 25, 1998, published by Intel Corporation and is incorporated herein by reference. The IAPC allows computer systems to be accessed quickly without the need for the user to idle through a lengthy boot process. The IAPC enables the user to obtain quick access to the operating system environment by replacing the Shutdown→Boot process with a Suspend→Resume or a Sleep→Awake cycle. One of the suspend states that is entered by a computer system having IAPC is defined as the ACPI S3 state, a low latency sleep state (also referred to as a 'deep sleep' state) where the computer system consumes approximately a few watts while in suspend state. The advantage over the soft-off state is that in S3 state, system context is saved in system memory and thus the system, devices and/or applications generally do not need to be reinitialized or reconfigured when the user returns to access the computer system. This typically results in a substantial time saving compared to the boot process.

Today, due to advances in the power and execution speed of information handling systems such as personal computers, the wakeup latency time or resume time has been reduced. Some computer system hardware/software manufacturers are requiring that the wakeup latency time for resuming from an S3 state be reduced to approximately 1 second or less. However, many electromechanical devices of the IHS such as cooling fans may require more than 1 second to wake up and be fully operational following a resume event. The slower wakeup latency time may be caused due to various factors such as inherently higher inertia and/or slower reacting components. As a result, the system BIOS may erroneously detect a mechanical failure because the device may be inherently slow to respond within the required 1 second time period. Traditional solutions have centered on improving the response times of these electromechanical and/or other devices by deploying expensive, fast acting circuits and/or components. This often results in increased product costs and reduced reliability.

Therefore, a need exists for improved accommodation of various devices of an IHS having different wakeup latency times following a resume event. More specifically, a need exist to develop tools and techniques for improving the ability to accommodate varying latency times of these devices without any substantial increases in costs. Accordingly, it would be desirable to provide tools and techniques for an improved wake mechanism of an IHS absent the disadvantages found in the prior methods discussed above.

SUMMARY

The foregoing need is addressed by the teachings of the present disclosure, which relates to an information handling system (IHS) including a processor, a memory coupled to the processor, a basic input/output system (BIOS) stored as instructions on a portion of the memory, an event handler component operable to receive notification of an occurrence of at least one event in the IHS, a first device configuration component operable to receive a first input from the event handler component and in response thereto configure at least one device from a first group of devices of the IHS, wherein each device included in the first group has a corresponding wakeup latency time less than or equal to a predefined transition time, a second device configuration component operable to receive a second input from the event handler component and in response thereto configure at least one device from a second group of devices of the IHS, wherein each device included in the second group has a corresponding wakeup latency time greater than the predefined transition time, a time delay component operable to introduce a predefined time delay in the configuration of the least one device from the second group prior to the predefined transition time, and a control transfer component operable to transfer control between the BIOS and an operating system of the IHS responsive to the at least one event.

In one embodiment, a method for transferring control from the BIOS of the IHS to an operating system of the IHS following a resume event, includes receiving notification of the resume event. The control is transferred within a predefined transition time. Configuration of at least one device of the IHS having a wakeup latency time greater than the predefined transition time is delayed to allow the at least one device to ramp up to an operational state. The control is transferred from the BIOS to the operating system within the predefined transition time. The control is transferred back from the operating system to the BIOS for the delayed configuration of the at least one device after the predefined transition time. The BIOS then performs the configuration of the at least one device.

Several advantages are achieved by the method and system according to the illustrative embodiments presented herein. The embodiments advantageously provide for a system and method for an improved wake mechanism of the IHS because it is flexible and applicable to any sub-system, e.g., sub-systems including fans and/or micro-controllers, and has the ability to accommodate varying wakeup latency times of these devices without any substantial increases in costs.

DETAILED DESCRIPTION

Figure 1:
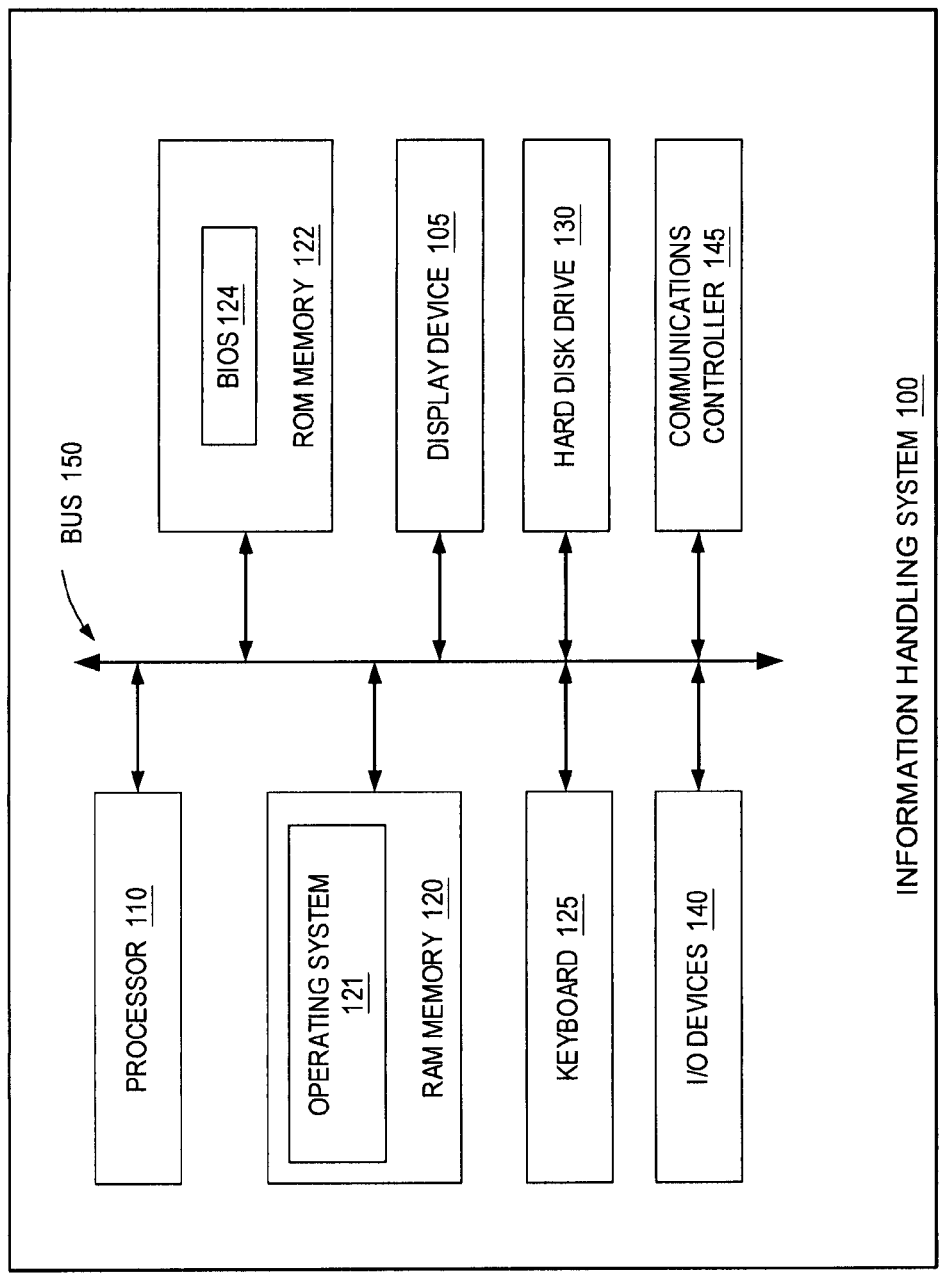
FIG. 1 illustrates a block diagram of an information handling system having an improved wake mechanism, according to an embodiment.

Novel features believed characteristic of the present disclosure are set forth in the appended claims. The disclosure itself, however, as well as a preferred mode of use, various objectives and advantages thereof, will best be understood by reference to the following detailed description of an illustrative embodiment when read in conjunction with the accompanying drawings. The functionality of various devices or components described herein may be implemented as hardware (including circuits), firmware (including application specific integrated circuits) and/or software or a combination thereof, depending on the application requirements.

The following terminology may be useful in understanding the present disclosure. It is to be understood that the terminology described herein is for the purpose of description and should not be regarded as limiting.

Devices having different wakeup latency times may be included in an IHS. One or more of these devices may require greater than 1 second to wake up and be fully operational following a resume event. As a result the system BIOS may detect an erroneous device failure due to the inability of the device to start up and be fully operational within the required 1 second time period. Traditional solutions have centered on improving the response characteristics of such devices by deploying expensive, fast acting circuits and/or components. It would be desirable to improve the wake mechanism by accommodating one or more devices of an IHS having wakeup latency times greater than a predefined time, e.g., 1 second, and preferably without incurring additional product costs. According to one embodiment, in a method and system for an improved wake mechanism of the IHS includes an event handler component (EHC) for handling an event in the IHS. A first device configuration component (DCC) receives a first input from the EHC. In response to the first input, it configures a device having a wakeup latency time (WLT) less than or equal to a predefined transition time. A second DCC receives a second input from the EHC. In response to the second input, it configures a device having a WLT greater than the predefined transition time. A time delay component introduces a predefined time delay in the configuration of the device having the WLT greater than the predefined transition time. A control transfer component transfers control between the BIOS and an operating system of the computer system responsive to the event. The embodiments advantageously provide for an improved wake mechanism of the IHS since it is flexible and applicable to any sub-system, e.g., sub-systems including fans and/or micro-controllers, and has the ability to accommodate varying wakeup latency times of these devices without any substantial increases in costs.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, the IHS may be a personal computer, including notebook computers, personal digital assistants, cellular phones, gaming consoles, a network storage device, or any other suitable device and may vary in size, shape, performance, functionality, and price.

The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit communications between the various hardware components.

FIG. 1 illustrates a block diagram of an information handling system 100 having an improved wake mechanism, according to an embodiment. The information handling system 100 includes a processor 110, a system random access memory (RAM) 120 (also referred to as main memory), an operating system (OS) 121, a non-volatile ROM 122 memory, a basic input output system (BIOS) 124, a display device 105, a keyboard 125 and an I/O controller 140 for controlling various other input/output devices. It should be understood that the term "information handling system" is intended to encompass any device having a processor that executes instructions from a memory medium. The IHS 100 is shown to include a hard disk drive 130 connected to the processor 110 although some embodiments may not include the hard disk drive 130. The processor 110 communicates with the system components via a bus 150, which includes data, address and control lines. In one embodiment, the IHS 100 may include multiple instances of the bus 150. A communications controller 145, such as a network interface card, may be connected to the bus 150 to enable information exchange between the IHS 100 and other devices (not shown).

The processor 110 is operable to execute the computing instructions and/or operations of the IHS 100. The memory medium, e.g., RAM 120, preferably stores instructions (also known as a "software program") for implementing various embodiments of a method in accordance with the present disclosure. In various embodiments the one or more software programs are implemented in various ways, including procedure-based techniques, component-based techniques, and/or object-oriented techniques, among others. Specific examples include assembler, C, XML, C++ objects, Java and Microsoft Foundation Classes (MFC). For example, in one embodiment, a portion of a program for the BIOS 124 may be implemented using an assembler language code.

Devices such as the processor 110, memory devices including ROM 122, and RAM memory 120, and the I/O controller 140 are typically included on a motherboard of the IHS 100. The BIOS 124 may be provided on a flash memory module separate from the RAM memory 120. The BIOS 124 is typically implemented as "firmware" (e.g., software stored on a chip). The BIOS 124 generally includes program instructions, which are executed when a user turns on a power button of the IHS 100. The BIOS 124 conducts tests (referred to as the 'POST' for Power On Self Test) to make sure the IHS 100 devices are working correctly, initializes the devices and then loads the operating system 121.

Each design of the motherboard requires a customized version of the BIOS 124. That is, the BIOS 124 is specially configured or programmed for the unique characteristics of the motherboard. For example, these include the processor 110 (because power management and other functions vary between different processors), chipset (each chipset may have a unique register interface for controlling its configuration), interrupt mapping (to map adapter slots with interrupt lines), the ACPI methods, and similar others. Additionally, characteristics of some devices such as cooling fans (not shown) may vary depending on the type of the processor 110 selected. The BIOS 124, when fully configured and customized for the motherboard, is operable to load and run the operating system 121 software.

The operating system 121 determines when to move a device such as hard disk drive 130, or even the entire system, from one power state to another. Specifically, the ACPI routines in the BIOS 124 allow the operating system to control power states in the hardware. The BIOS 124 when activated performs the low-level hardware handshaking required to change the device's power state. A user's action and/or inactivity of the processor 110 may place the IHS 100 system in a standby or suspend state, e.g., S2, S3 or S4 state, to conserve power. A wake or resume event such as pressing of a key on a keyboard causes the IHS 100 system to transition from the S2, S3 or S4 state to an awake state, which is typically a higher, more active power state, e.g., S0 state. When transitioning from S2, S3 or S4 state to the higher power state certain portions of the POST test sequence are disabled. As described earlier, some computer system hardware/software manufacturers are requiring that the wakeup latency time for resuming from an S3 state be reduced to approximately 1 second or less. For resuming from an S4 or S5 state the wakeup latency time may be higher. In some cases, a state machine (not shown) may be defined to enable the processor 110 to respond to wake events within a predefined transition time such as within 1 second, and before any software begins to execute.

In one embodiment, a portion of the BIOS 124 program also includes instructions configured to control an improved wakeup mechanism for various devices coupled to the IHS 100, where each device has a predefined wakeup latency time. Additional detail of the improved wakeup mechanism is described in FIG. 2.

Figure 2:
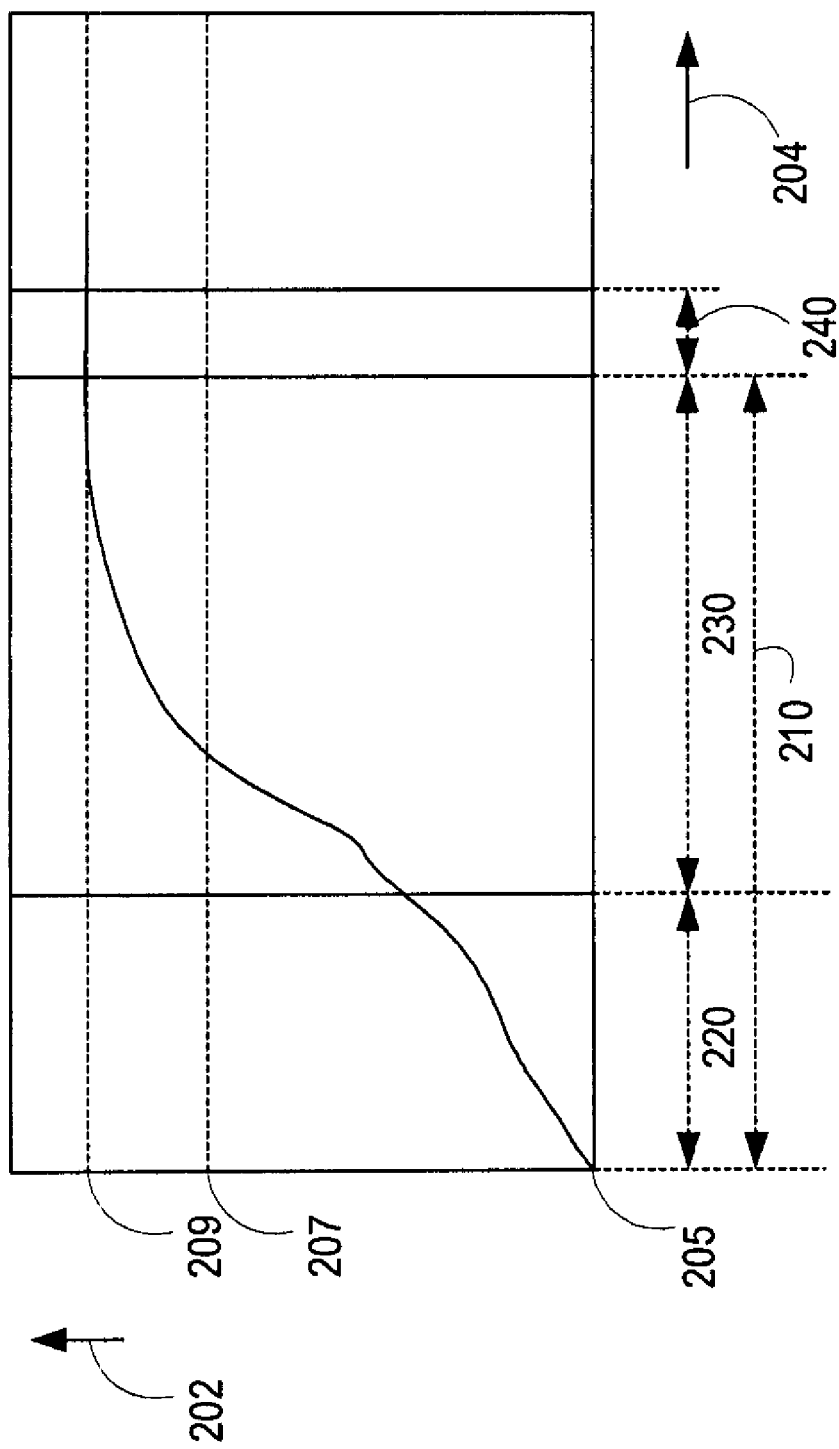
FIG. 2 illustrates an improved wakeup mechanism for an information handling system transitioning from a lower power state to a higher power state, according to an embodiment.

FIG. 2 illustrates an improved wakeup mechanism for an information handling system transitioning from a lower power state to a higher power state, according to an embodiment. The IHS 100 typically includes multiple devices. In the depicted embodiment, a device status measurement such as a fan speed 202 is shown as a function of elapsed time 204 following an event. In one embodiment, the devices may be classified into two groups (not shown). For example, a first group of devices having their wakeup latency time equal to or less than a predefined transition time $t_1$ 220, and a second group of devices having their wakeup latency time greater than the predefined transition time $t_1$ 220. Each of the first and second group of devices has at least one device as a member. That is, the first group includes at least one device having a wakeup latency time (not shown) less than or equal to the predefined transition time $t_1$ 220 and the second group includes at least one device having a wakeup latency time $t_w$ 210 greater than the predefined transition time $t_1$ 220. For example, the second group may include a cooling fan assembly (not shown) operable to remove heat generated by the processor 110 and other devices on the motherboard. In one embodiment, the wakeup latency time $t_w$ 210 for the fan assembly may be defined to be N seconds, where N may vary from approximately greater than 1 second to approximately 10 seconds based on present technology. As one skilled in the art may appreciate, technology advances may further decrease the value of N. The second group may also include a micro-controller (not shown), similar to the communications controller 145, to control nodes coupled to a local area network (not shown). Due to the potentially complex nature of the micro-controller design and/or the large number of components used, the wakeup latency time $t_w$ 210 measured in N seconds for the micro-controller may vary from approximately greater than 1 second to approximately 5 seconds.

In response to a wake or resume event at $t_0$ 205, a trigger signal informs the processor 110 that it should resume normal operation. Following the resume event at $t_0$ 205, control of the IHS 100 system is with the BIOS 124. As described before, the BIOS 124 program goes through a portion of the POST sequence, where certain other portions of the POST test sequence are disabled. The BIOS 124 goes through initialization and configuration of devices included in the first group, e.g., devices having corresponding wakeup latency time $t_w$ 210 less than or equal to the predefined transition time $t_1$ 220 for transitioning from the lower power state to the higher power state. The BIOS 124 advantageously delays the initialization and configuration of the at least one device from the second group until after the predefined transition time $t_1$ 220. A block diagram of the BIOS 124 to implement the improved wakeup mechanism is described in additional detail in FIG. 3, according to one embodiment.

At the end of the predefined transition time $t_1$ 220, configuration of the at least one device included in the first group is substantially complete and control of the IHS 100 system is transferred from the BIOS 124 to the operating system 121. Just prior to transferring the control to the operating system 121 at $t_1$ 220, the BIOS 124 starts a timer device (not shown) to advantageously introduce a delay $t_d$ 230 in the initialization and configuration of the at least one device included in the second group. The amount of delay $t_d$ 230 introduced may vary on factors such as 1) the longest wakeup latency time of all devices in the second group, and/or 2) the sleep state entered just prior to the resume event at $t_0$ 205.

In one embodiment, multiple timers may be set. For example, each device included in the second group may have a corresponding timer device set with each timer having a different delay $t_d$ 230 to match the characteristics of that device. At the end of the $t_d$ 230 time period all devices included in the second group would have been initialized and be operational. In the depicted embodiment, the fan speed reaches its steady state speed by the end of the $t_d$ 230 time period. By introducing the $t_d$ 230 delay the BIOS 124 program advantageously allows sufficient time for the fan device included in the second group to increase speed beyond a threshold speed 207 to a steady state speed 209 and thereby avoid erroneously detecting failures of the fan device within the predefined transition time $t_1$ 220.

Upon expiration of the predetermined delay $t_d$ 230, a system management interrupt (SMI) signal (not shown) is generated. The SMI causes transfer of the control from the operating system 121 to the BIOS 124 and is received as an SMI event. The BIOS 124 launches the initialization and configuration of the at least one device included in the second group. The BIOS 124 completes the initialization and configuration of the at least one device within another predefined transition time $t_2$ 240. In one embodiment, $t_1$ 220 and $t_2$ 240 may be equal. At the end of $t_2$ 240, the control of the IHS 100 system is transferred back from the BIOS 124 to the operating system 121. Presence of actual mechanical, hardware and/or other failures within the at least one device are detected by the BIOS 124 during or at the end of $t_2$ 240.

In one embodiment, the predetermined delay $t_d$ 230 may also be advantageously used to perform a delayed configuration of one or more devices after a particular driver or any other software program has been started by the operating system 121. Therefore, as described herein, the term "device" may refer to a mechanical and/or electrical hardware device, as well as to a software device such as a device driver program.

Figure 3:
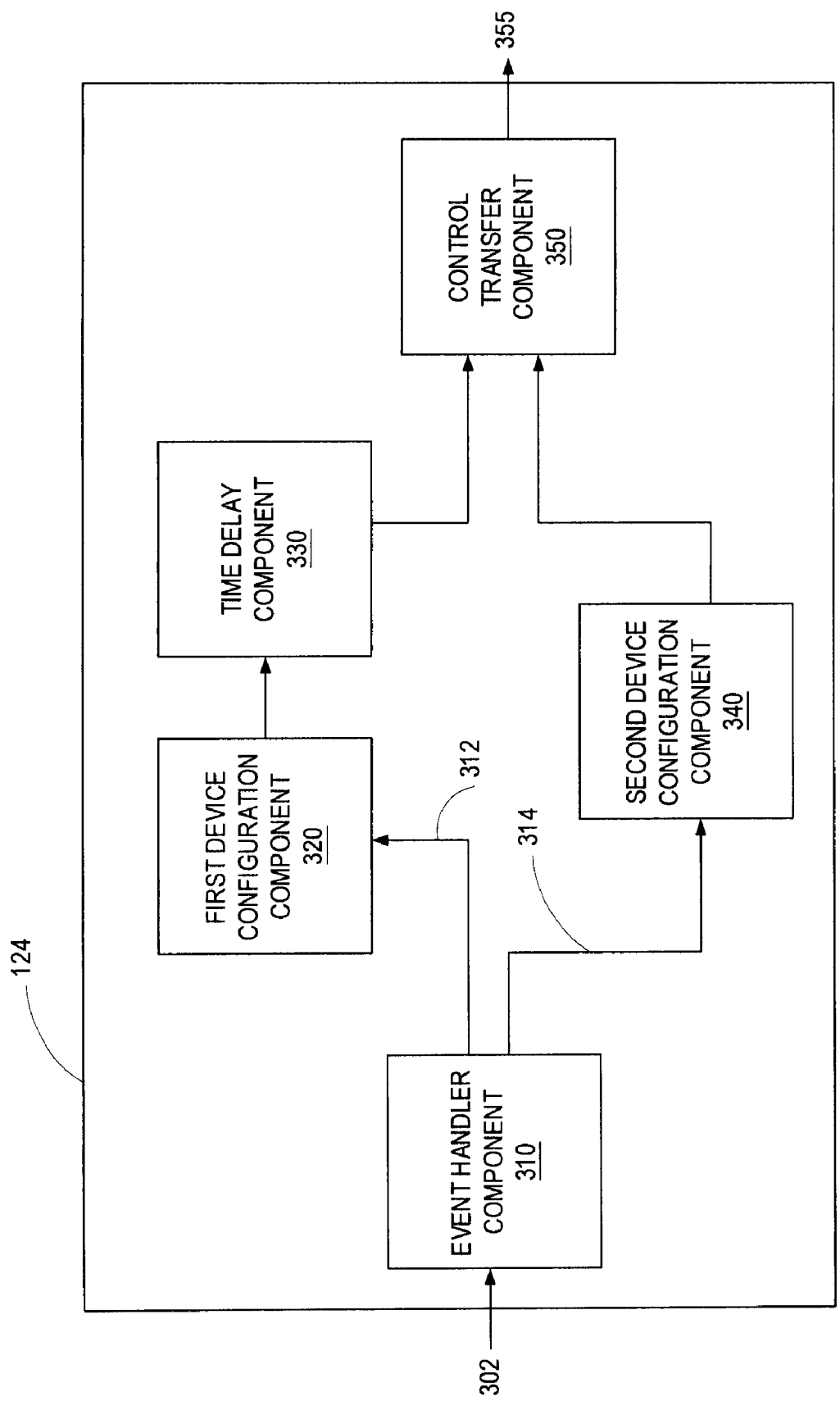
FIG. 3 illustrates a BIOS block diagram to implement an improved wakeup mechanism, according to an embodiment.

FIG. 3 illustrates a BIOS block diagram to implement an improved wakeup mechanism, according to one embodiment. In the depicted embodiment, a portion of the BIOS 124 includes an event handler component 310, a first device configuration component 320, a second device configuration component 340, a time delay component 330 and a control transfer component 350. Each of these components may be implemented in hardware, software, firmware and/or a combination thereof.

The event handler component 310 is operable to receive as an event input 302 a notification of an occurrence of at least one event in the IHS 100. Examples of events being notified to the event handler component 310 are a resume event and a SMI event. The first device configuration component 320 is operable to receive a first input 312 from the event handler component 310 corresponding to a resume event. In response to receiving the first input 312, the first device configuration component 320 is operable to configure the at least one device (not shown) of the IHS 100 included in the first group. The first group may include one or more devices. The first device in the first group has a first wakeup latency time less than or equal to the predefined transition time $t_1$ 220. Just prior to the predefined transition time $t_1$ 220 and upon completion of the configuration of the first device (or the last member of the first group, whichever is later), the time delay component 330 is operable to introduce the predefined delay $t_d$ 230 to configure one or more members of the second group. The control transfer component 350 is operable to transfer a control output 355 between the BIOS 124 and the operating system 121 of the IHS 100 responsive to the resume event.

Upon expiration of the predefined delay $t_d$ 230 an SMI event is caused. The event handler component 310 is operable to receive notification of the SMI event. The second device configuration component 340 is operable to receive a second input 314 from the event handler component 310 corresponding to the SMI event. In response to receiving the second input 314, the second device configuration component 340 is operable to configure each member included in the second group of devices of the IHS 100. Each device included in the second group of devices has a second wakeup latency time greater than the predefined transition time $t_1$ 220. Upon completion of the configuration of at least one device in the second group (or the last member, whichever is later) the control transfer component 350 is operable to transfer the control output 355 between the BIOS 124 and the operating system 121 of the IHS 100 responsive to the SMI event.

In one embodiment, the predetermined delay $t_d$ 230 may also be advantageously used to generate the SMI event and perform a delayed configuration of one or more devices after a particular driver or any other software program has been started by the operating system 121. Therefore, as described herein, the term "device" may refer to a mechanical and/or electrical hardware device, as well as to a software device such as a device driver program.

In one embodiment, the first and second device configuration components 320 and 340 may be combined. The first at least one device may be configured responsive to receiving notification of the resume event and the second at least one device may be configured responsive to receiving notification of the SMI event. In this embodiment, the time delay component 330 may be bypassed when configuring the at least one device of the second group.

Figure 4:
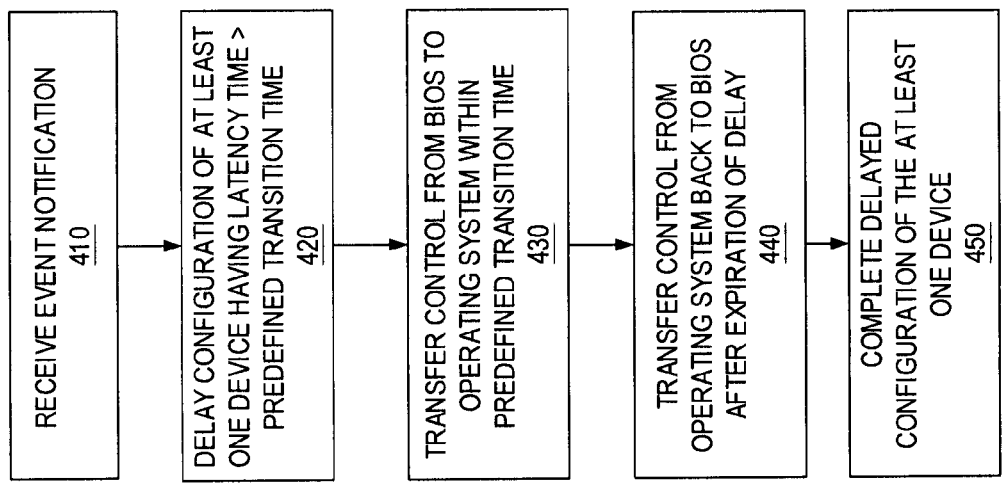
FIG. 4 is a flow chart illustrating a method for transferring control from the BIOS to the operating system shown in FIG. 1 following a resume event, according to an embodiment.

FIG. 4 is a flow chart illustrating a method for transferring control from BIOS 124 of the IHS 100 to the operating system 121 of the IHS 100 following a resume event, according to an embodiment. In this embodiment, the control is transferred within the predefined transition time $t_1$ 220.

In step 410, a notification of the resume event is received as the event input 302. In step 420, configuration of at least one device of the IHS 100 having a wakeup latency time $t_w$ 210 greater than the predefined transition time $t_1$ 220 is advantageously delayed. In one embodiment, a timer is configured to cause the predefined delay $t_d$ 230. The timer is activated just prior to expiration of the predefined transition time $t_1$ 220.

In step 430, the control of the IHS 100 is transferred from the BIOS 124 to the operating system 121 within the predefined transition time $t_1$ 220. In step 440, the control of the IHS 100 is transferred back from the operating system 121 to the BIOS 124 after the predefined transition time $t_1$ 220, responsive to the expiration of the timer configured in step 420. In one embodiment, the expiration of the timer occurs after the predefined delay $t_d$ 230 time period and in response to the expiration of the time period a SMI event is generated. The SMI event is notified to the BIOS 124 as the event input 302. In step 450, the configuration of the at least one device included in the second group is performed in response to the expiration of the timer. In this embodiment, the configuration of the at least one device of the second group is advantageously delayed beyond the predefined transition time $t_1$ 220 to allow the at least one device of the second group to complete initialization and startup. As described earlier, the term "device" may refer to a mechanical and/or electrical hardware device, as well as to a software device such as a device driver program.

Various steps described above may be added, omitted, combined, altered, or performed in different orders. For example, the step 415 (not shown) may be added between steps 410 and 420 to perform configuration of at least one device of the IHS 100 included in the first group.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An information handling system (IHS) comprising:
    a processor;
    a memory coupled to the processor;
    a basic input/output system (BIOS) stored as instructions on a portion of the memory;
    an event handler component operable to receive notification of an occurrence of at least one event in the IHS;
    a first device configuration component operable to receive a first input from the event handler component and in response thereto configure at least one device from a first group of devices of the IHS, wherein each device included in the first group has a corresponding wakeup latency time less than or equal to a predefined transition time;
    a second device configuration component operable to receive a second input from the event handler component and in response thereto configure at least one device from a second group of devices of the IHS, wherein each device included in the second group has a corresponding wakeup latency time greater than the predefined transition time;
    a time delay component operable to introduce a predefined time delay in the configuration of the least one device from the second group prior to the predefined transition time; and
    a control transfer component operable to transfer control between the BIOS and an operating system of the IHS responsive to the at least one event.

2. The system of claim 1, wherein the predefined time delay is caused by setting a timer, wherein a value of the timer is equal to the predefined time delay.

3. The system of claim 2, wherein the timer is set responsive to the event handler component receiving notification of a resume event.

4. The system of claim 2, wherein control transfer component is operable to transfer the control from the operating system to the BIOS, the transfer being responsive to an expiration of the timer.

5. The system of claim 2, wherein an expiration of the timer triggers a system management interrupt (SMI) event, the SMI event causing transfer of the control from the operating system to the BIOS, the event handler component receiving notification of the SMI event.

6. The system of claim 1, wherein the predefined time delay is sufficient to allow the at least one device from the second group to transition to a steady state.

7. The system of claim 1, wherein the second device configuration component is further operable to:
    initialize the at least one device from the second group;
    prepare the at least one device to receive at least one instruction from the IHS; and
    determine whether the at least one device is operational in response to receiving the at least one instruction.

8. The system of claim 7, wherein the initialize includes:
    providing power to the at least one device; and
    executing an initialization sequence of operations to restore the at least one device to a predefined operating state.

9. The system of claim 1, wherein the control transfer component is operable to transfer the control from the BIOS to the operating system upon completion of the configuration of the least one device from the second group or all devices included in the second group, whichever is later.

10. The system of claim 1, wherein the at least one device from the second group is a hardware device.

11. The system of claim 1, wherein the at least one device from the second group is a software device.

* * * * *